(12) United States Patent
Bennett et al.

(10) Patent No.: US 8,994,807 B2
(45) Date of Patent: Mar. 31, 2015

(54) MICROSCOPY SYSTEM AND METHOD FOR CREATING THREE DIMENSIONAL IMAGES USING PROBE MOLECULES

(75) Inventors: Brian Thomas Bennett, Park City, UT (US); Joerg Bewersdorf, Branford, CT (US); Erik Jorgensen, Salt Lake City, UT (US); Sam Hess, Stillwater, ME (US); Travis Gould, New Haven, CT (US); Mudalige Siyath Gunewardene, Orono, ME (US)

(73) Assignees: University of Utah Research Foundation, Salt Lake City, UT (US); University of Maine System Board of Trustees, Bangor, ME (US); The Jackson Laboratory, Bar Harbor, ME (US)

( * ) Notice: Subject to any disclaimer, the term of this patent is extended or adjusted under 35 U.S.C. 154(b) by 863 days.

(21) Appl. No.: 13/257,588

(22) PCT Filed: Mar. 18, 2010
(Under 37 CFR 1.47)

(86) PCT No.: PCT/US2010/027866
§ 371 (c)(1),
(2), (4) Date: Apr. 11, 2012

(87) PCT Pub. No.: WO2010/108038
PCT Pub. Date: Sep. 23, 2010

(65) Prior Publication Data
US 2013/0147916 A1 Jun. 13, 2013

Related U.S. Application Data

(60) Provisional application No. 61/161,345, filed on Mar. 18, 2009, provisional application No. 61/177,701, filed on May 13, 2009.

(51) Int. Cl.
*H04N 7/18* (2006.01)
*H04N 15/00* (2006.01)
(Continued)

(52) U.S. Cl.
CPC .......... *G02B 21/367* (2013.01); *G02B 21/0068* (2013.01); *G02B 21/008* (2013.01);
(Continued)

(58) Field of Classification Search
CPC .. G02B 21/365; G02B 21/367; G02B 21/002; H04N 7/18; G01N 21/6458
See application file for complete search history.

(56) References Cited

U.S. PATENT DOCUMENTS 5,434,272 A 7/1995 Corrie et al.
(Continued)

FOREIGN PATENT DOCUMENTS

JP 55-032304 3/1980
(Continued)

OTHER PUBLICATIONS

Betzig; Proposed Method for Molecular Optical Imaging; Optics Letters; Feb. 1, 1995; pp. 237-239; vol. 20, No. 3.
(Continued)

*Primary Examiner* — Dave Czekaj
*Assistant Examiner* — Nam Pham
(74) *Attorney, Agent, or Firm* — Thorpe North & Western, LLP

(57) ABSTRACT

A system (100) and method for creating three dimensional images using probe molecules is disclosed and described. A sample is mounted on a stage (160). The sample has a plurality of probe molecules. The sample is illuminated with light, causing the probe molecules to luminesce. The probe luminescence can be split into at least four paths corresponding to at least four detection planes corresponding to object planes in the sample. The at least four detection planes are detected via a camera (155). Object planes in corresponding recorded regions of interest are recorded in the camera (155). A signal from the regions of interest is combined into a three dimensional image.

19 Claims, 9 Drawing Sheets

(51) Int. Cl.
*H04N 13/02* (2006.01)
*G02B 21/36* (2006.01)
*G02B 21/00* (2006.01)
*G02B 21/22* (2006.01)
*G02B 21/16* (2006.01)
*G01B 11/24* (2006.01)

(52) U.S. Cl.
CPC ............ *G02B21/0056* (2013.01); *G02B 21/22* (2013.01); *G02B 21/0064* (2013.01); *G02B 21/16* (2013.01); *G01B 11/24* (2013.01); *G02B 21/0076* (2013.01)
USPC ................................ 348/79; 348/46; 348/47

(56) References Cited

U.S. PATENT DOCUMENTS

| | | | |
|---|---|---|---|
| 6,444,992 | B1 | 9/2002 | Kauvar et al. |
| 6,462,771 | B1 | 10/2002 | Kitagawa |
| 6,804,385 | B2 | 10/2004 | Eisfeld et al. |
| 7,535,012 | B2 | 5/2009 | Betzig et al. |
| 7,609,391 | B2 | 10/2009 | Betzig |
| 7,626,694 | B2 | 12/2009 | Betzig et al. |
| 7,626,695 | B2 | 12/2009 | Betzig et al. |
| 7,626,703 | B2 | 12/2009 | Betzig et al. |
| 7,675,045 | B1 | 3/2010 | Werner et al. |
| 2001/0030290 | A1 | 10/2001 | Stern |
| 2004/0017607 | A1 | 1/2004 | Hauger et al. |
| 2004/0171091 | A1 | 9/2004 | Lesko et al. |
| 2004/0196457 | A1 | 10/2004 | Aono et al. |
| 2004/0196549 | A1 | 10/2004 | Aono |
| 2006/0012785 | A1 | 1/2006 | Funk et al. |
| 2006/0126063 | A1 | 6/2006 | Cluzel et al. |
| 2007/0076190 | A1 | 4/2007 | Nakaya et al. |
| 2007/0097496 | A1 | 5/2007 | Ulrich et al. |
| 2007/0297048 | A1 | 12/2007 | Kinoshite |
| 2008/0007733 | A1 | 1/2008 | Marks et al. |
| 2008/0068588 | A1 | 3/2008 | Hess et al. |
| 2008/0068589 | A1 | 3/2008 | Hess et al. |
| 2008/0070322 | A1 | 3/2008 | Hess et al. |
| 2008/0070323 | A1 | 3/2008 | Hess et al. |
| 2008/0085550 | A1 | 4/2008 | Werner et al. |
| 2008/0111086 | A1 | 5/2008 | Betzig et al. |
| 2008/0219893 | A1 | 9/2008 | Ohtsuka |
| 2008/0225906 | A1 | 9/2008 | Ishihara et al. |
| 2009/0015912 | A1 | 1/2009 | Ferenczi |
| 2009/0017449 | A1 | 1/2009 | Van Oijen et al. |
| 2009/0073563 | A1 | 3/2009 | Betzig |
| 2009/0078868 | A1 | 3/2009 | de Jonge |
| 2009/0134342 | A1 | 5/2009 | Hell et al. |
| 2009/0135432 | A1 | 5/2009 | Betzig |
| 2009/0201366 | A1 | 8/2009 | Sase et al. |
| 2009/0206251 | A1 | 8/2009 | Hess et al. |
| 2009/0242798 | A1 | 10/2009 | Bewersdorf et al. |
| 2010/0283835 | A1* | 11/2010 | Bewersdorf et al. ............ 348/47 |
| 2011/0025831 | A1 | 2/2011 | Bewersdorf et al. |
| 2011/0069382 | A1 | 3/2011 | Toomre et al. |

FOREIGN PATENT DOCUMENTS

| | | |
|---|---|---|
| JP | 09-159922 | 6/1997 |
| JP | 2001-013413 | 1/2001 |
| JP | 2002/540540 | 11/2002 |
| JP | 2003-083894 | 3/2003 |
| JP | 2004-201526 | 7/2004 |
| JP | 2005-188999 | 7/2005 |
| JP | 2006-162790 | 6/2006 |
| JP | 2007-140322 | 6/2007 |
| WO | WO02/037938 | 5/2002 |
| WO | WO2006/127692 | 11/2006 |
| WO | WO2010/108038 | 9/2010 |
| WO | WO2010/108042 | 9/2010 |

OTHER PUBLICATIONS

Esa et al; Three-Dimensional Spectral Precision Distance Microscopy of Chromation Nanostructures After Triple-Colour DNA Labeling: A Study of the BCR Region on Chromosome 22 and the Philadelphia Chromosome; Journal of Microscopy; Aug. 2000; pp. 96-105; vol. 199, pt. 2.

Gordon et al; Single-Molecule High-Resolution Imaging with Photobleaching; PNAS; Apr. 27, 2004; pp. 6462-6465; vol. 101, No. 17.

Hasek et al; Colocalization of Cortical Microtubules and F-Actin in Dipodascus Magnusii Using Confocal Laser Scanning Microscopy; Folia Microbiol.; 2003; pp. 177-182; vol. 48, No. 2.

Juette et al; Three-Dimensional Sub-100 NM Resolution Fluorescence Microscopy of Thick Samples; Nature Methods; Jun. 2008; pp. 527-529; vol. 5, No. 6.

Lidke et al; Superresolution by Localization of Quantum Dots Using Blinking Statistics; Optics Express; Sep. 5, 2005; pp. 7052-7062; vol. 13, No. 18.

Lippincott-Schwartz et al; Photobleaching and Photoactivation: Following Protein Dynamics in Living Cells; Imaging in Cell Biology; Sep. 2003; pp. 87-89 and pp. 810-814.

Paar et al.; High Throughout FRET Screening of the Plasma Membrane Based on TIRFM; Cytometry Part A; May 2008; pp. 442-450; vol. 73A, No. 5.

Patterson et al; A Photoactivatable GFP for Selective Photolabeling of Proteins and Cells; Science; Sep. 13, 2002; pp. 1873-1877; vol. 297.

Pralle et al; Three-Dimensional High-Resolution Particle Tracking for Optical Tweezers by Forward Scattered Light; Microscopy Rese3arch and Technique; 1999; pp. 378-386; vol. 44.

Thompson et al; Precise Nanometer Localization Analysis for Individual Fluorescent Probes; Biophysical Journal; May 2002; pp. 2775-2783; vol. 82.

Unemployed Scientists Create Ultrapowerful Microscope; http://www.photonics.com/printerFreindly.aspx?ArticleID=26470; as accessed Dec. 30, 2009; 5 pages.

Yildz et al; Myosin V Walks Hand-Over-Hand: Single Fluorophor Imaging with 1.5 NM Localization; Science; 2003; pp. 2061-2066; vol. 300.

Prabhat et al; Simultaneous Imaging of Several Focal Planes in Fluorescence Microscopy for the Study of Cellular Dynamics in 3D; Three-Dimensional and Multidimensional Microscopy: Image Acquisition and Processing XII; SPIE the International Society for Optical Engineering; 2006; pp. 60900L-1-60900L-7.

U.S. Appl. No. 13/236,509, filed Sep. 19, 2011, Brian Thomas Bennett.

U.S. Appl. No. 13/236,509, filed Sep. 19, 2011, Brian Thomas Bennett; office action dated Apr. 29, 2014.

* cited by examiner

MICROSCOPY SYSTEM AND METHOD FOR CREATING THREE DIMENSIONAL IMAGES USING PROBE MOLECULES

FIELD OF THE INVENTION

This invention relates to microscopy. More specifically, the invention relates to super resolution microscopy and the creation of three dimensional images obtainable therewith. Therefore, the present invention relates generally to the fields of physics, optics, chemistry and biology.

BACKGROUND

Until about a decade ago, resolution in far-field light microscopy was thought to be limited to 200-250 nanometers in the focal plane, concealing details of sub-cellular structures and constraining its biological applications. Breaking this diffraction barrier by the seminal concept of stimulated emission depletion ("STED") microscopy has made it possible to image biological systems at the nanoscale with light. STED microscopy and other members of reversible saturable optical fluorescence transitions ("RESOLFT") family achieve a resolution >10-fold beyond the diffraction barrier by engineering the microscope's point-spread function ("PSF") through optically saturable transitions of the (fluorescent) probe molecules.

However, slow progress in 3D super-resolution imaging has limited the application of prior art techniques to two-dimensional ("2D") imaging. The best 3D resolution until recently had been 100 nanometers axially at conventional lateral resolution. 4 Pi microscopy achieved this through combination of two objective lens of high numerical aperture, in an interferometric system. 4 Pi microscopy was only recently shown to be suitable for biological imaging. Only lately the first 3D STED microscopy images have been published exceeding this resolution moderately with 139 nanometer lateral and 170 nanometer axial resolutions. While this represents a 5-fold smaller resolvable volume than provided by conventional microscopy, it is still at least 10-fold larger than a large number of sub-cellular components, such as synaptic vesicles, for example. A more recent development achieves 3D resolution below 50 nm in all 3 directions by combining STED with 4 Pi microscopy.

To measure dynamic properties of a biological system, particle-tracking techniques have been developed over the last decades. Particle-tracking techniques can localize small objects (typically less than the diffraction limit) in live cells with sub-diffraction accuracy and track their movement over time by taking a time series of recordings. Single particles are imaged conventionally, with or without total internal reflection illumination, or in a multi-plane arrangement. Every particle produces a diffraction limited image. By determining the center of the blurry image (the width of the intensity distribution is equivalent to the 'spatial resolution' of the microscope), the position of the particle can be determined. The spatial localization accuracy of single particles in a fluorescence microscope is the square root of the total number of detected fluorescence photons from the particle in the absence of background and effects due to finite pixel size.

Recently, this concept has also entered the emerging field of super-resolution microscopy. In techniques such as 'FPALM', 'PALM', 'STORM', or 'PALMIRA', biological samples are labeled by photoactivatable fluorescent molecules. Only a sparse distribution of single fluorophores is activated, and hence imaged, at any time by a sensitive camera. This allows spatial separation of the diffraction-limited intensity distributions of practically every fluorescing molecule and localization of individual fluorophores with accuracy typically in the 10 nm range (standard deviation $\sigma$). By bleaching or deactivating the fluorescing molecules during the read-out process and simultaneously activating additional fluorophores, a large fraction of the probe molecules are imaged over a series of many image frames. A super-resolved image at typically 20-30 nm resolution (measured as the FWHM of a distribution; ~2.4$\sigma$) is finally assembled from the determined single molecule positions.

Recently, particle-tracking of sub-cellular fluorescent components and localization-based super-resolution microscopy techniques have advanced from a two-dimensional (2D) imaging method to the third dimension. Localization in the z-direction is complicated by the fact that camera images are 2D. Different z-positions do not result in easily detectable shifts of the center of mass as it is in the 2D case. The axial position has to be deduced from the defocused 2D intensity distributions taking the complex dependence of the focal intensity distribution in the axial direction into account. Analyzing the diameter of the rings appearing in the defocused images, for example, allows conclusions on its z-position. A major obstacle is the axial symmetry of the intensity distribution (in a perfect microscope): for an observed 2D image an axial position of $z_0$ is equally possible as $-z_0$. To break this symmetry, multi-plane detection has been developed.

Recording images in different focal planes simultaneously provides means to determine the axial position of a particle uniquely. This multi-plane detection approach has successfully been used in slightly varying arrangements to track particles down to single quantum dots within cells and has been recently applied to localization-based 3D super-resolution microscopy.

The context of morphology and movement of a biological particle or structure with regard to other structures in a cell can be of high importance. To measure this, typically multiple labels marking different structures (for example two different proteins) by different photo-physical properties (usually two different fluorescence colors) are imaged. Multi-color recordings are used in super-resolution microscopy as well as in particle tracking.

In super-resolution microscopy and particle tracking, small structures featuring only a small number of labels, often only single fluorescent molecules, are observed. Background suppression is therefore of high importance. An often applied method in 2D particle tracking and 2D super-resolution microscopy is illumination at an angle at which the light experiences total internal reflection at the coverslip-specimen interface. The light in this 'total internal reflection microscopy' (TIRF) mode can in this case only penetrate on the order of 70 to 200 nm into the specimen (depending on an adjustable incidence angle) and no background light can be created in planes beyond this depth range therefore reducing the amount of light penetration into the sample dramatically.

SUMMARY

There is a need for a microscopy system that can provide 3D imaging with resolution below 100 nanometers in all three dimensions. The inventors have recognized a need for a microscopy system that can be used for three dimensional imaging without scanning. In light of the problems and deficiencies noted above, microscopy systems and methods for creating three dimensional images using probe molecules is described. In accordance with one embodiment, a method is provided for creating three dimensional images using probe molecules. A sample having a plurality of probe molecules may be mounted on a stage. The sample may be illuminated with light to cause probe luminescence. The probe luminescence may be split into at least four paths corresponding to at least four detection planes corresponding to object planes in the sample. The at least four detection planes are detected via a camera. Alternatively, the probe luminescence can be split into at least two detection planes corresponding to at least two object planes in the sample. For example, a four-channel configuration can offer three of more colors or two colors and polarization which can optionally use a single focal plane. Object planes in corresponding recorded regions of interest are recorded in the camera. A signal from the regions of interest can be combined and analyzed to produce a three dimensional image.

According to one embodiment, a microscopy system is configured for creating three dimensional images using probe molecules. The system includes a sample stage for mounting a sample. The system also includes at least one light source configured to cause luminescence in at least one subset of probe molecules. At least two beam splitters are positioned to split a luminescence beam into at least four luminescence beams corresponding to at least one object plane, and in one aspect at least two object planes. At least one camera is positioned to detect the at least four luminescence beams and capture a plurality of images. An image construction module is configured to combine the plurality of captured images from the at least four luminescence beams and construct a three dimensional image using the plurality of captured images.

Additional embodiments of systems and methods for creating three dimensional images using probe molecules are also provided. For example, a microscopy system for creating three dimensional images using probe molecules is provided. The system includes a sample stage for mounting a sample having a plurality of probe molecules. A light source can be used to illuminate the sample and cause the probe molecules to fluoresce. An objective lens in the system can direct a light beam from the light source toward the sample. A total internal reflection fluorescence condenser can alter a beam path of the light beam between a region proximal to a side of the objective lens back aperture and a region proximal to a center of the objective lens back aperture, e.g. the path and position of the illumination beam to a set of conditions including the beam striking a region proximal to the side of the objective lens and a condition where the beam strikes a region proximal to center of the objective lens. Images of probe molecule fluorescence at a plurality of object planes can be captured via a camera positioned to capture or detect probe molecule fluorescence. The system can also include an image construction module for combining captured images from the plurality of object planes to construct a three dimensional image.

In accordance with another embodiment, a method is provided for creating three dimensional images using probe molecules. A sample is mounted on a stage. The sample can have a plurality of probe molecules. A light beam may be directed from a light source through a first portion of an objective lens. At least one subset of the plurality of probe molecules can be caused to fluoresce by illuminating the sample with the light source. A camera can be used to capture a first image of probe molecule fluorescence corresponding to a first object plane. The light beam from the light source can be directed through a second portion of the objective lens which is different from the first portion. At least one of the first and second portions of the objective lens can cause total internal reflection of the light beam within a material spatially proximal to or including the sample on a substrate. A second image of probe molecule fluorescence corresponding to a second object plane can be captured using the camera. A three dimensional image can then be constructed using the captured images.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention and they are, therefore, not to be considered limiting of its scope. It will be readily appreciated that the components of the present invention, as generally described and illustrated in the figures herein, could be arranged, sized, and designed in a wide variety of different configurations. Nonetheless, the invention will be described and explained with additional specificity and detail through the use of the accompanying drawings in which:

DETAILED DESCRIPTION

Figure 1:
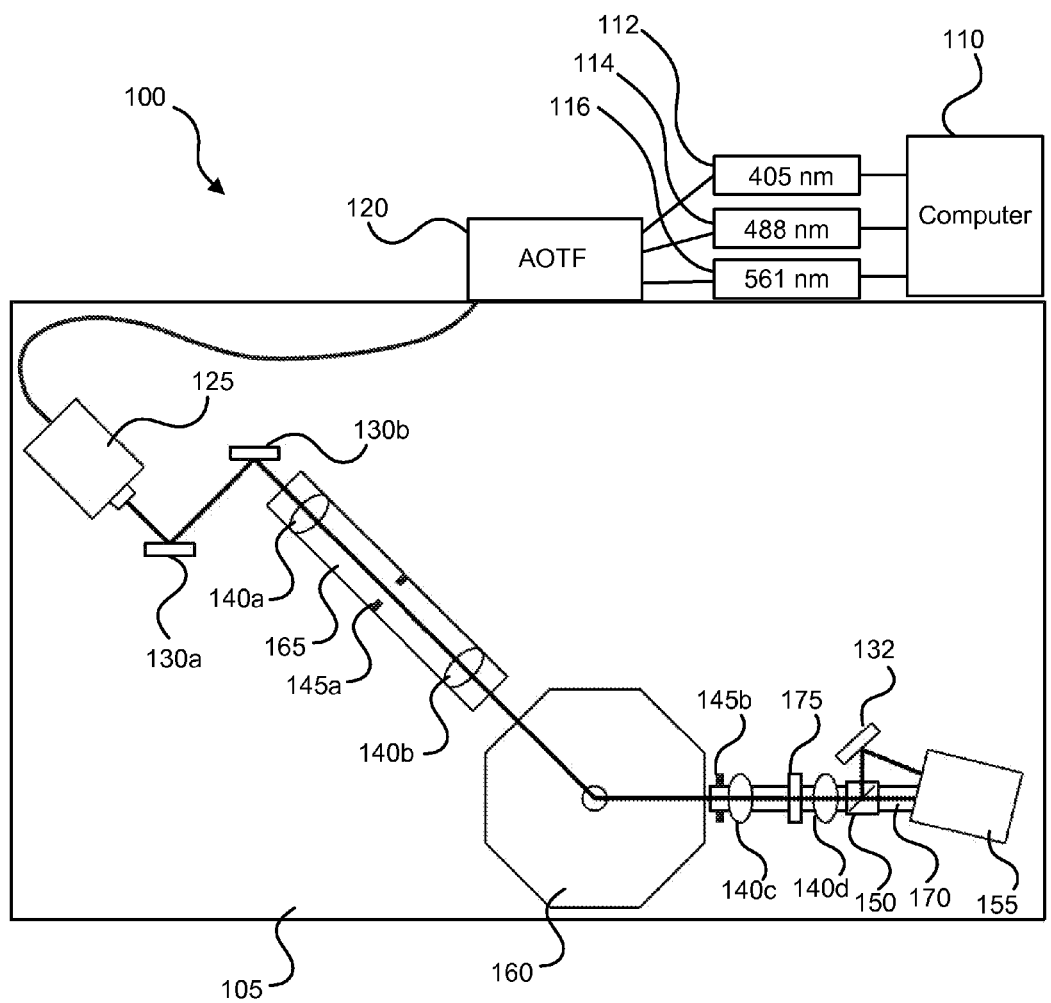
FIG. 1 is a microscopy system for creating three dimensional images using an acoustic optical tunable filter and a total internal reflection fluorescence condenser in accordance with one embodiment.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a beam splitter" includes reference to one or more of such devices.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, the terms "fluorescence" and "luminescence" may be used interchangeably and no distinction is intended or implied unless otherwise explicitly stated as such. Likewise, variants of the terms "fluorescence" and "luminescence", such as "luminesce" or "fluoresce" are also used synonymously.

As used herein, "proximal" refers to the proximity of two structures or elements. Particularly, elements that are identified as being "proximal" may be in a precise location. Such elements may also be near or close to a location without necessarily being exactly at the location. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

In the present disclosure, the term "preferably" or "preferred" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Creation of Three Dimensional Images Using Probe Molecules

Simultaneous, single molecule, multi-channel acquisition of photoactivatable or photoswitchable fluorescent proteins in three dimensions can be achieved without scanning. The system utilizes and is capable of switching between TIRF microscopy and Biplane imaging microscopy. This allows for an additional imaging detection channel, as will be described below. In accordance with an embodiment shown in FIG. 1, a microscopy system 100 is provided for three dimensional, single color, biplane imaging without scanning. A plurality of lasers, such as 405 nm 112, 488 nm 114, and 561 nm 116, can be used as light sources. Other wavelengths, numbers of light sources, and types of light sources can also be used. Although specific light sources may be mentioned herein, other types of light sources can also be used to provide the functions of activation and readout as described herein. The 405 nm laser or other lasers can be used to activate a subset of probe molecules. A selected range of intensities can be used to convert only a sparse subset of molecules at a time, e.g. to activate at least one molecule with at least one activation photon. Although powers can vary, a power ranging from about 0.01 μW to 1.0 mW can be suitable in some cases. The power used can depend on the particular probe molecules and sample characteristics. The 488 nm laser is used to detect photoconvertible fluorescent probes in a natural state prior to conversion. The photoconvertible fluorescent probes can exist as green probe molecules prior to conversion. The 561 nm laser has a high power and will, immediately following conversion by the 405 nm laser, excite the converted fluorescent probe, subsequently providing for collection of excitation light by a CCD camera 155. The fluorescent probe can subsequently undergo photobleaching, thus removing the probe from the population. This process, combined with irreversible switchable fluorescent probes, disallows further imaging of these molecules. Typically, high power from the laser can be used to decrease the overall time of the process. Generally, a minimum of 25 mW may be considered. Lower powers can be used, which may increase image acquisition time. Use of a very high powered 561 nm laser, e.g. 200 mW, for example, can result in a considerably more rapid process of excitation, collection and bleaching than may result from a lower powered laser or light source.

Although other probe molecules may be suitable, the probe molecules used herein can generally be fluorophores. The fluorophores can be imaged either sequentially or simultaneously. The system can include a fluorophore localization module configured to localize each fluorophore in three dimensions. The sample can include cells having photoactivatable or photoswitchable fluorescent molecules (PAFMs) residing in a biological membrane, including photoactivatable or photoswitchable fluorescent proteins or photoactivatable or photoswitchable fluorescent lipids or lipids with photoactivatable or photoswitchable fluorescent molecules attached by a chemical bond. In one example, the chemical bond can be a covalent bond. In one optional aspect, the cells can include at least two species of PAFMs to allow simultaneous or subsequent imaging of at least two different subsets of materials. The PAFM may be configured to use Forster resonance energy transfer (FRET) to transfer energy to another probe molecule or to accept energy from another molecule. Broadly, the PAFM can be an energy transfer donor or an energy transfer acceptor.

An acoustic optical tunable filter (AOTF) 120, controllable through software provides the ability to properly attenuate multiple light sources simultaneously and control the efficiency of activation, excitation and bleaching. For example, a 488 nm laser line allows one to image or locate photoactivatable fluorescence proteins prior to conversion by the 405 nm laser, from a visibly green fluorescence to red fluorescence. The AOTF can also control the angle or position of the excitation within the objective back aperture.

The AOTF can provide external control of light source intensity for modulating the light beam. The AOTF can also be used to control the direction or position of the light beam. Software can be used to control the AOTF to vary illumination intensity, direction or position of the light sources independently of any other filters. The AOTF can be configured to control the light sources to provide time-dependent sequences of illumination of at least one wavelength. An optical fiber can connect the light source to the AOTF. An optical fiber combiner can combine the optical power carried by two optical fibers, such as from a plurality of light sources into a single output fiber. The system can also use a total internal reflection fluorescence (TIRF) condenser 125 with existing laser lines. The condenser can include an enclosed box containing a piezo-driven motor allowing switching from the critical angle required for TIRF to regular illumination which can penetrate the sample completely and back again.

Still referring to FIG. 1, a TIRF condenser 125 (which may in some cases be located in a microscope stand 160) can be removed to facilitate the use of a field aperture 145a in the excitation pathway. The CCD camera 155 can be removed from the microscope stand to accommodate the use of a 50/50 beam splitter 150 to achieve the 3-dimensional aspect (separation of a transmitted and reflected light path) of biplane image acquisition. Also, a field aperture 145b and band pass filter 175 can be included between the CCD camera and the microscope stand. Three lasers 112, 114, 116 can be used, as described above. The lasers can be useful in conversion of photoactivatable molecules. All three laser lines can be simultaneously delivered to the system in an automated and attenuable manner through existing software. Optics 140a-d can be added in both the excitation and detection paths of the microscope set-up.

The CCD camera can optionally be an electron multiplying charge coupled device (EMCCD) 155. In one alternative aspect, the camera system can comprise a plurality of cameras. An optional external liquid cooler can be used to cool the EMCCD. The liquid cooler can use thermoelectric cooling to cool the EMCCD. The EMCCD can include at least two detection channels. The camera can capture images from a transmitted light channel. In one aspect, the transmitted light can be imaged by differential interference contrast. The camera can capture images of one or more molecules at a single instant or as a function of time. The system can include a particle analysis module in communication with the camera and configured to provide analysis of particle tracking. Photoactivatable dyes within a sample can be activated with UV activation. The dyes can be excited to fluoresce by 488 nm or 561 nm light and then bleached. The system and method allow for collection of a dye in three dimensional space over approximately 1 to 2 micron thickness of a sample without scanning.

An optical beam splitter 150 is included to split an optical beam (typically within the detection path) into two beams. For example, the beam splitter can be a 50-50 beam splitter or a polarizing beam splitter. Splitting the beam creates two beams focused in different planes so that different object planes of a sample can be imaged, or rather probe luminescence from the sample originating from different object planes is focused onto the camera and detected and/or captured by the camera. Images from the different object planes can be used to create three dimensional images, using software, firmware, or even hardware. Splitting the beam with the beam splitter can result in two beams having different optical path lengths. The difference in optical path length can be utilized to image the sample at multiple different object planes.

The system can include a plurality of mirrors, 130a-b, 132 to direct a light beam along the light path as illustrated. The various optics, apertures, beam splitters, and so forth used in the system can be installed on a construction rail 165, or a micro-dovetail rail 170, as shown in FIG. 1. The system can be set up on a table 105 or other surface, and may also include a computer 110 having a processor configured to process data and operate the software.

Figure 2:
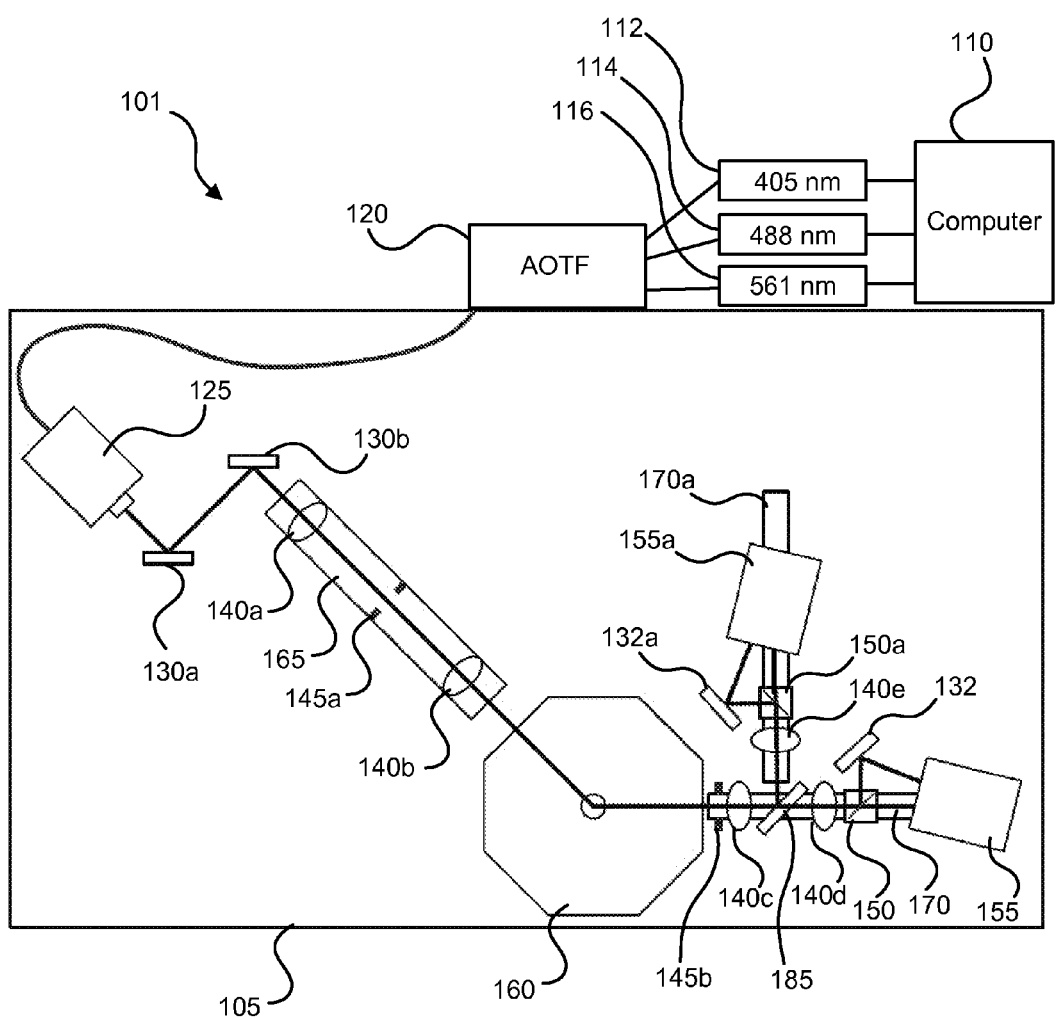
FIG. 2 is a microscopy system for creating three dimensional images using an acoustic optical tunable filter, a total internal reflection fluorescence condenser and a dichroic beam splitter in accordance with one embodiment.

Referring to FIG. 2, a microscopy system 101 is shown which is similar in many regards to the system of FIG. 1. However, FIG. 2 includes a dichroic beam splitter 185 for separating two wavelengths of a light beam. Each wavelength light beam can further be separated by a corresponding 50-50 beam splitter 150, 150a. Additional optics 140e, mirrors 132a, micro-dovetail rails 170a, cameras 155a, etc. can also be optionally used to accommodate and capture the additional beams. In this manner, four beams and four beam paths are created. The system and method allow for three dimensional, simultaneous, two color biplane imaging without scanning. Two photoactivatable dyes within a sample can receive simultaneous UV activation. Further, these two now switched, e.g., activated, dyes can be simultaneously excited. Cameras 155, 155a are used to substantially simultaneously collect images of or luminescence from the 2 dyes in three dimensional space over approximately 1 to 2 microns of depth without scanning. Though the example of FIG. 2 illustrates the creation of four beams along four different beam paths, it is to be understood that the beams may in fact be split any number of times using any suitable combination of beam splitters. For example, the beam may be split into eight different beam paths which may be separated by wavelength, polarization, etc.

Figure 3:
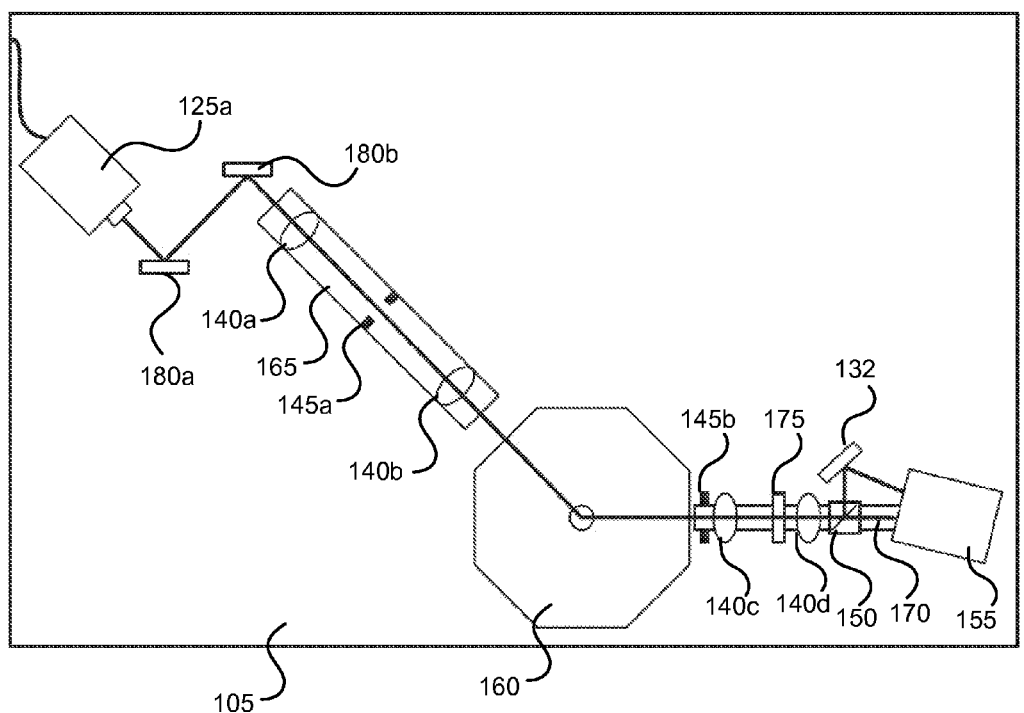
FIG. 3 is a microscopy system for creating three dimensional images using a total internal reflection fluorescence condenser in accordance with one embodiment.
Figure 4:
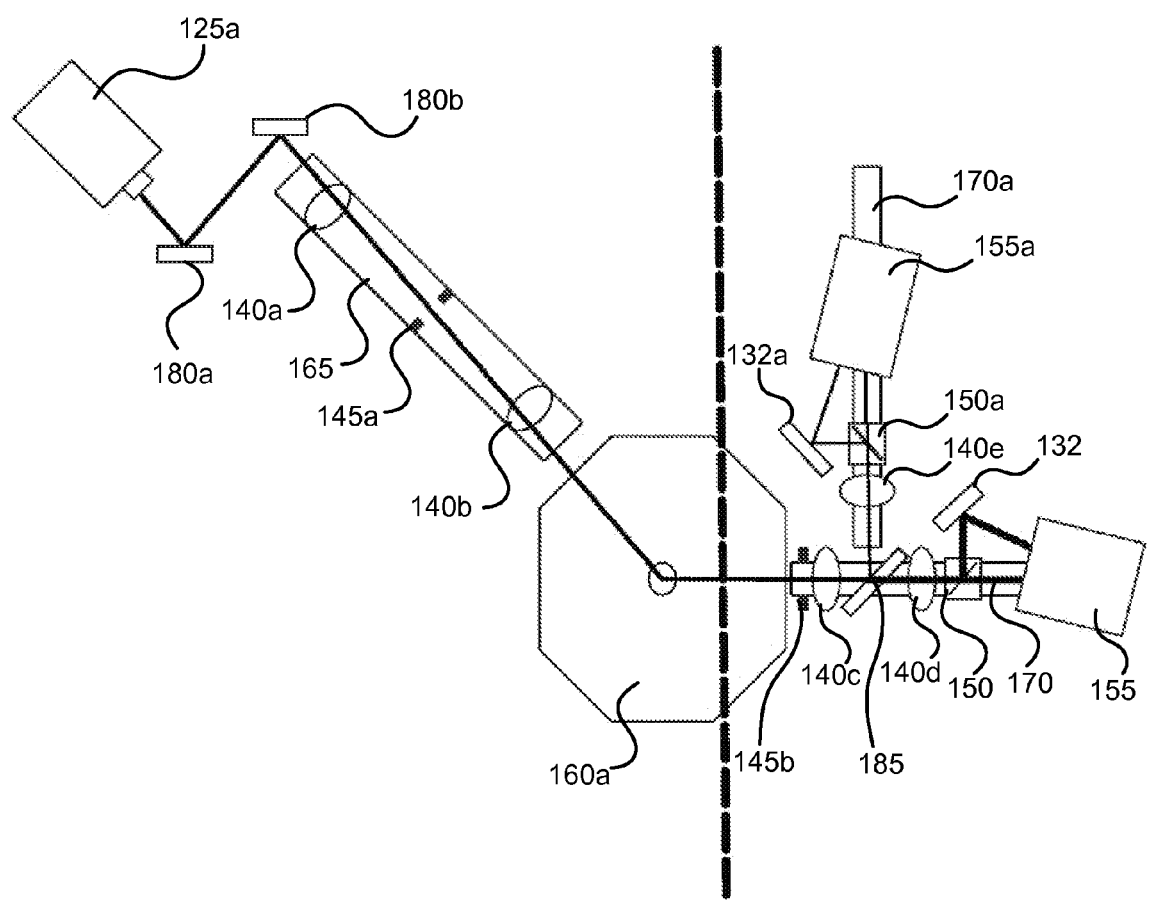
FIG. 4 is a microscopy system for creating three dimensional images using a dichroic beam splitter and a plurality of beam splitters in accordance with one embodiment.

FIGS. 3-4 show embodiments similar in many regards to those shown in FIGS. 1 and 2. In these examples, the TIRF condenser 125a includes an automated angle control. Also, the mirrors 130a-b of the previous examples are replaced with kinematic mirror mounts with visible mirrors 180a-b to be used with the angle-controlling TIRF condenser. It is noted that a TIRF condenser can be used to alter a beam path between passing through an objective lens proximal to the center of the objective lens. The TIRF condenser can alter the beam path to pass through a portion of the objective lens proximal to the side of the objective lens and back. Such alteration is used to switch between causing a light source beam to pass through a substrate supporting the sample and causing the laser beam to be totally internally reflected at the interface between a substrate and a specimen. Where the laser beam passes through the substrate and the sample, the whole depth of the sample is illuminated, whereas when the laser beam is totally internally reflected at the interface only a layer of less than 100 to a few hundred nanometers of thickness is illuminated. This allows a user to switch between different imaging modes with different background suppression and different depth access to the sample. More specifically, when the laser beam passes through the substrate, the optical beam will have a first optical path length for imaging a first object plane. When the laser beam is reflected within the substrate, energy from the beam exists within a small area outside the substrate and can cause luminescence in probe molecules in the area adjacent to the substrate. The illumination from the area adjacent to the substrate creates a second optical path length for imaging a second object plane. Whereas FIGS. 1-2 describe splitting a light beam to have multiple beam path lengths to obtain probe molecule images at different object planes, switching the source beam from transmission to total internal reflection can likewise result in different optical beam paths useful for 3D imaging.

Further regarding use of the TIRF, the light beam can be directed at an optical interface supporting a sample at an angle above the critical angle for total internal reflection. The TIRF can comprise an automated TIRF module configured to automatically determine an optimal TIRF angle. In one aspect, the automated TIRF module can also modulate rapidly between a critical angle for TIRF and widefield microscopy. The TIRF module may also be configured to rapidly modulate between different TIRF angles. An automated beam steering device can be used to tilt the light beam within the sample. The automated beam steering device can be used for TIRF microscopy, or for performing sheet illumination. For example, the automated beam steering device may be a sheet illumination beam steering device configured to steer at least one light beam from the light source parallel to the image planes through the sample. The sheet illumination can be used to provide an object plane in the sample for imaging. Images captured from this object plane can be combined with other images captured through any of the methods described herein or other image capturing methods known in the art to create three dimensional images as described herein.

FIG. 3 shows the TIRF directing a light beam along a first path towards the microscope stand 160 (including the sample location at center). FIG. 4 shows the TIRF directing the light beam towards the microscope stand 160a at an angle with respect to the first path. The vertical dotted line of FIG. 4 denotes that the components to the right of the line are the same as shown in FIG. 2. To the left of the line, the TIRF condenser, the mirrors, and the light beam path have been modified. Also, it is noted that the microscope stand of FIG. 4 includes the band pass filter of FIG. 1 or 3 situated within the microscope stand.

Figure 5:
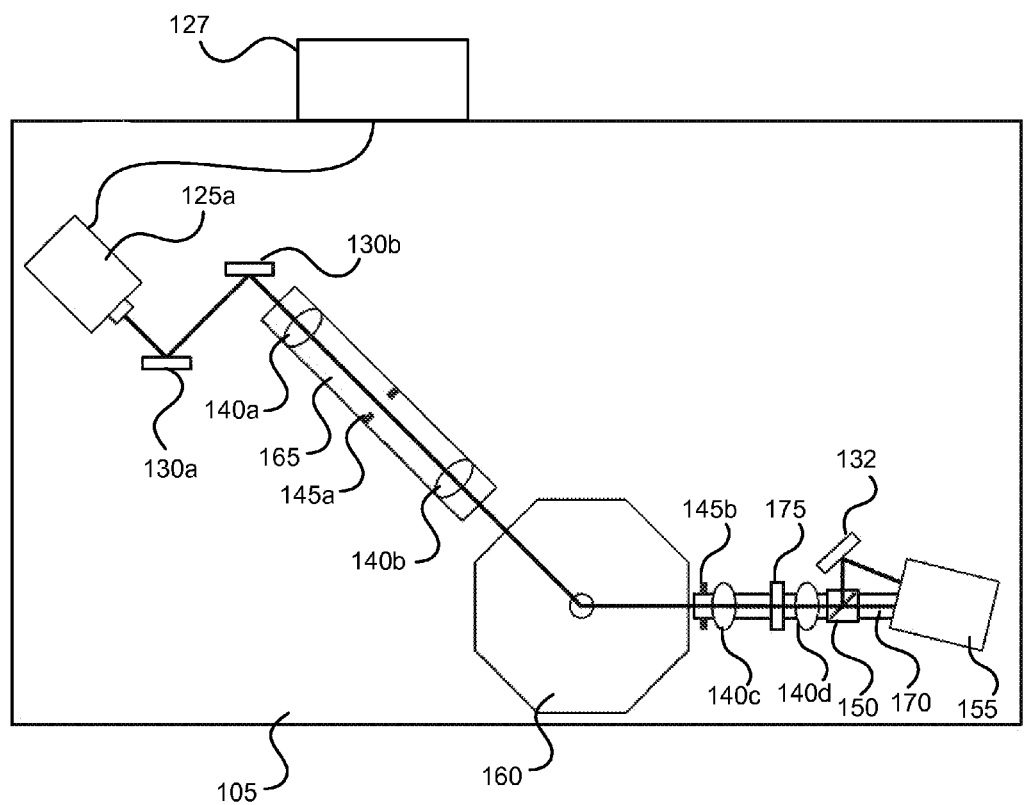
FIG. 5 is a microscopy system for creating three dimensional images using a non-coherent light source in accordance with one embodiment.

FIG. 5 shows an embodiment similar in many regards to the embodiment of FIG. 1. However, in FIG. 5, a four channel attenuable, modular light emitting diode (LED) unit 127 is used as the light source. For example, the LED unit may provide 365 nm, 470 nm, 530 nm, and 590 nm wavelengths at +/−50 nm per channel. It is to be understood that a four channel LED unit is not required and the number of channels may be altered according to requirements of a particular application. Furthermore, the systems and methods may be performed entirely with non-coherent light, entirely with coherent light, or with a combination of non-coherent and coherent light. Previous three dimensional probe molecule imaging techniques have relied solely on coherent light sources (e.g., lasers) and have been unable to operate with non-coherent light. LEDs can be cost effective to use and easier to work with than lasers. LEDs are also attenuable. The light of an LED spreads out gradually enough that nearby probes can be detected and/or imaged before luminescence has diminished. Further, the gradual spreading allows detection and/or imaging of a first subset of probe molecules before a second subset is ready to be detected and/or imaged.

Figure 6:
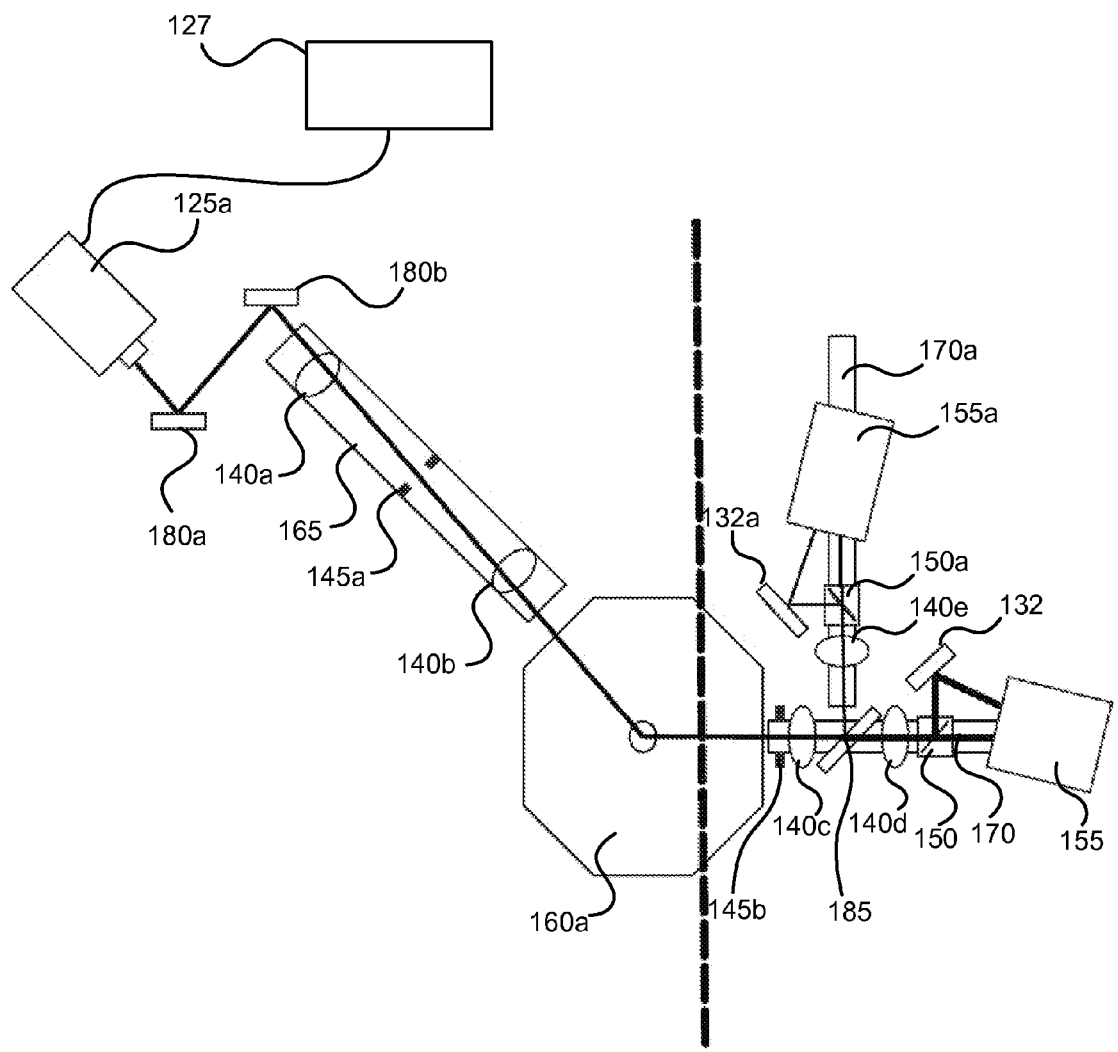
FIG. 6 is a microscopy system for creating three dimensional images using a non-coherent light source, a dichroic beam splitter and a plurality of beam splitters in accordance with one embodiment.

FIG. 6 shows an embodiment similar in many regards to the embodiment of FIG. 4. As in FIG. 5, an LED unit 127 is used as the light source. As in FIG. 2, a dichroic 185 can be used to separate a plurality of light beam wavelengths which can then be imaged on two cameras 155, 155a. As will be described below, in some embodiments a single camera may be used for capturing images from the four light beam paths shown in FIGs. 2, 4, or 6.

Figure 7:
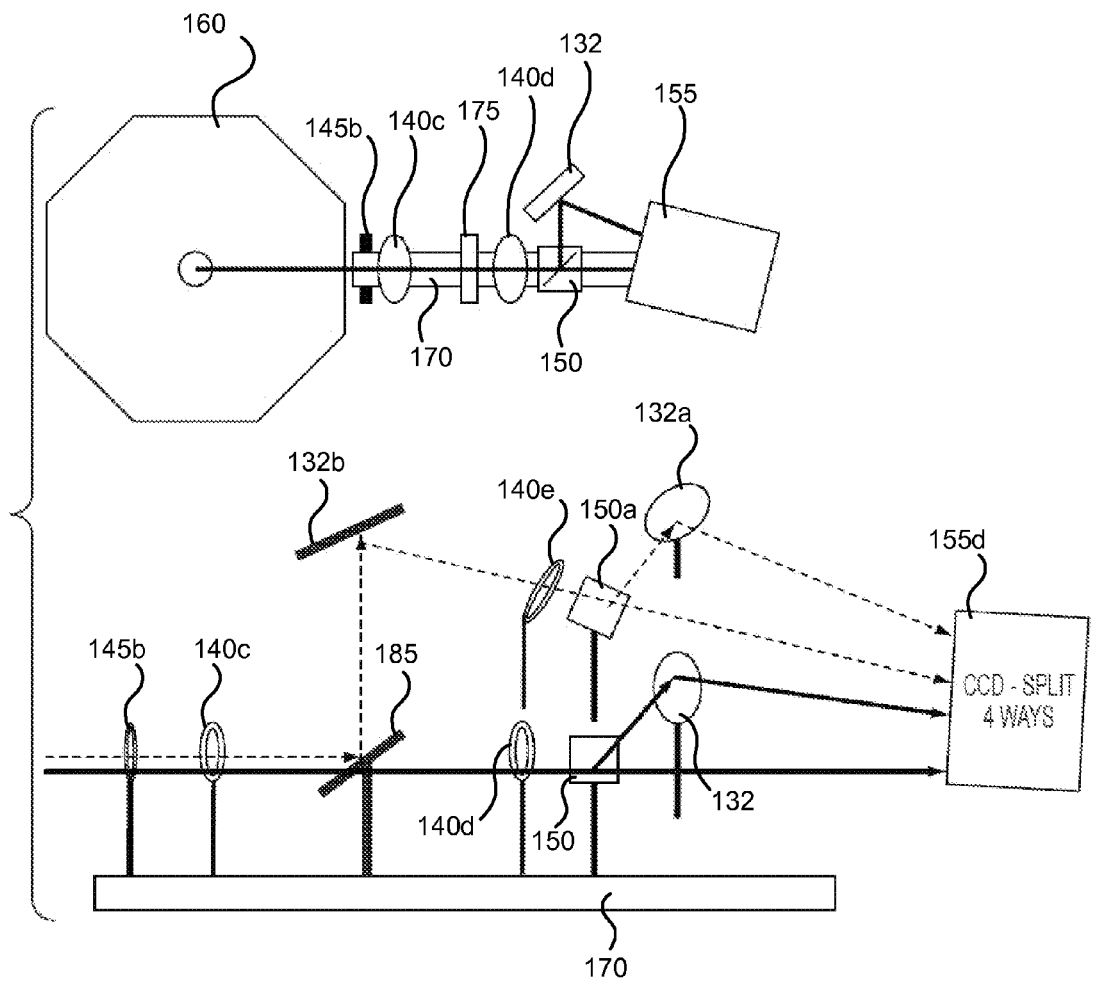
FIG. 7 is a microscopy system for creating multi-color three dimensional images on a single camera in accordance with one embodiment.

FIG. 7 depicts an embodiment of a system for two color, single camera, biplane, three dimensional imaging. The top portion of FIG. 7 is similar to a portion of the system shown in FIG. 1 and is essentially duplicated to achieve the four-way beam splitting shown in the bottom portion of FIG. 7. A dichroic beam splitter 185 is used to separate red and green light from a single light beam into two light beams. Each of these light beams is split using a corresponding beam splitter 150, 150a and imaged on a CCD chip 155d of a camera. The CCD chip can have four regions each for imaging a different input light beam. The system depicted can include an additional mirror 132b and optic 140e above those previously described to facilitate the four way beam split to a single camera chip.

Figure 8:
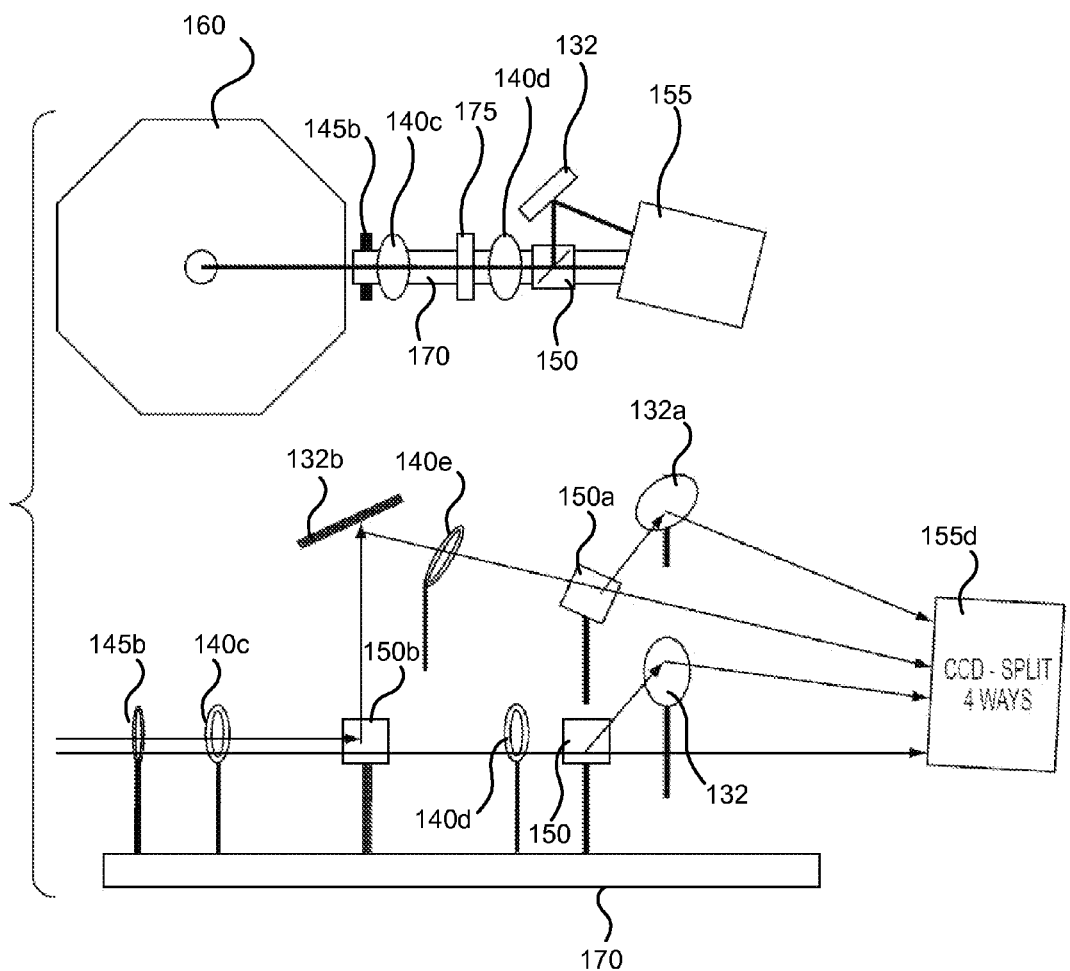
FIG. 8 is a microscopy system for creating four-plane three dimensional images on a single camera in accordance with one embodiment.

FIG. 8 depicts a system similar in many regards to the system shown in FIG. 7. The dichroic beam splitter 185 of FIG. 7 is replaced with a 50-50 beam splitter 150b. This configuration allows for one color, four plane, single camera, three dimensional imaging.

It is noted that in the above embodiments using a beam splitter that beam path bifurcation is used to allow imaging of probe molecules over a thick section sample without scanning.

A field aperture can be included in the system to block parts of the sample from excitation light or radiation. This reduces background noise and also avoids activation and bleaching of areas of the sample that are not meant to be imaged at that time point. It also reduces overlap between different regions of interest (ROIs) if a camera chip is shared to image several sample planes simultaneously in the multi-plane arrangement. Without the field aperture, parts of the sample may be excited and bleached before equipment or a user is able to measure luminescence. Further such luminescence can be ambient and disrupt the quality of image or detected luminescence of a target area of the sample.

A beam steering device or a sample movement device (which in one aspect may be a sample stage) can be used to move the activation/excitation beam up or down along the sample to image other portions of the sample. In one aspect, the beam may be steered up or down approximately one micron at a time and can image in one dimension as much as six microns or more of a sample. The system and method are able to process an entire 1 to 2 micron section of a sample all at once without scanning. Further, imaging at a depth can be accomplished by moving a stage and without scanning.

Previous methods of imaging thick optical sections of samples included scanning and stacking images. When stacking images, the focal point is not changed and resolution is lost. When moving up and down in a sample, more distortion is created. For example, what may actually be a spherical object may appear elliptical due to distortion through scanning and stacking. Therefore, the approach described herein can typically avoid many of these imaging artifacts.

With use of the TIRF condenser, one additional channel can be imaged Additionally, one could use TIRF illumination combined with biplane detection. This would allow background reduction while allowing for 3D biplane imaging.

Also, it is noteworthy that with the TIRF condenser, it is not required that photoactivatable probes be used. Any fluorescent probe may be used.

The system can include an image construction module. The image construction module can include circuitry or a processor and software. The image construction module can be built integrally with the microscope system or separately. The image construction module can take captured images from different focal planes or object planes and combine them to produce a three dimensional image output. The images acquired by the camera can be constructed by the image construction module in real time to provide a real time three dimensional display of combined captured images. An image acquisition module can be used to automatically monitor the fluorescence images, and automatically trigger image acquisition when a number of active fluorophores per time is between predetermined thresholds. The image construction module can be configured to analyze images from the camera and to calculate at least one of a total florescence and a number of pixels over a threshold fluorescence value within a user defined region of interest, generating a single scalar value varying with time. While some of the dyes discussed herein are photoactivatable, meaning they are first activated and then excited, it is to be understood that non-photoactivatable dyes which are driven into a dark state and then imaged when they reappear from the dark state. Single step dyes or probes may also be used. For example, a single step dye may be used which is activated/excited and bleached in one step. While dyes discussed herein have included red and green colors, it is to be understood that dyes can be in many different colors. A suitable laser or light source at the right wavelength may be used to activate and/or excite the colors being used.

In one embodiment, an optical microscope system with heightened resolution and capable of providing three dimensional images is provided. Though the following discussion does not reference a particular individual figure, the system described may be understood by reference to FIGS. 1-9 and to the above descriptions of embodiments. The microscope system can include a sample stage for mounting a sample having a plurality of probe molecules. A light source, such as a non-coherent or coherent light source may be used to illuminate the sample. At least one lens can be configured to direct a beam of light from the at least one non-coherent light source toward the sample causing the probe molecules to luminesce. A camera can detect luminescence from the probe molecules and a light beam path modification module can alter a path length of the probe molecule luminescence to allow camera luminescence detection at a plurality of object planes. The system can also include a field aperture configured to restrict the light beam to limit a number of probe molecules caused to luminesce. An acoustic optical tunable filter can be configured to fine tune a power of the light source. A focusing module can be used to automatically maintain a plane of focus of the light source within the sample.

In one aspect, the light beam path modification module can be a beam splitter configured to split the probe molecule luminescence into at least two beam paths. In this example the camera can be configured to detect the probe molecule luminescence from the at least two beam paths. The beam splitter can be a dichroic beam splitter for dichroically separating the probe luminescence into at least two wavelengths of light prior to or after splitting the probe luminescence. A first path of the at least two paths into which the probe luminescence is split can correspond to a first wavelength of the at least two wavelengths, and a second path of the at least two paths into which the probe luminescence is split can correspond to a second wavelength of the at least two wavelengths. The beam splitter can be a polarizing beam splitter. The beam splitter can be a 50:50 beam splitter. Further, the beam splitter can include a plurality of beam splitters in order to provide imaging of additional focal planes within the sample. The plurality of beam splitters can be any combination of dichroic mirrors, 50:50 beam splitters, and polarizing beam splitters, or other types of beam splitters. For example, the plurality of beam splitters can be a 50:50 beam splitter and two polarizing beam splitters. As another example, the plurality of beam splitters can be two dichroic mirrors. As another example, the beam plurality of beam splitters may include at least one cylindrical lens beam splitter.

In another aspect, and as has been described in greater detail above, the light beam path modification module can comprise at least two beam splitters configured to split the probe molecule luminescence into at least four beam paths. The camera can be configured to detect the probe molecule luminescence from the at least four beam paths.

In another aspect, the light beam path modification module can comprise a linear scanning device configured to scan the sample for probe luminescence at the plurality of object planes for the creation of a three dimensional image with extended axial range.

Other components may be included in the system. For example, a total internal reflection fluorescence condenser (TIRF) or an AOTF can be configured to alter a beam path of the light beam between a region proximal to a side (or periphery) of an objective lens and a region proximal to a center of the objective lens. A widefield microscope stand can be used to support the sample, although other stands can be suitable. An isolation table can be used to reduce vibration of the system and prevent undesirable artifacts from being introduced into the collected data.

In one aspect, the system can include a plurality of light sources and at least one of the plurality of light sources can be a laser. The laser can be a laser capable of exciting two-photon fluorescence or two-photon photochemistry. Non-coherent and coherent light sources can be used in combination. In one aspect, the non-coherent light source can be a point light source. The light source can be an activation light source or a readout light source. The activation and readout light sources can be the same light source or different light sources. The activation and/or readout light sources can be coherent or non-coherent light. The activation and readout light sources do not need to both be coherent or non-coherent light. As described above, a non-coherent light source may comprise an LED or any other type of non-coherent light source. Laser light sources can be used as coherent light sources. In one aspect the laser light source may comprise at least one modulated laser polarization. A plurality of light sources may be used to provide more than one polarization within a sample plane.

A feedback module can be used to provide user feedback triggering image acquisition using an analog voltage representing the total fluorescence output of the camera. In one aspect, the feedback module can include a speaker attached to the voltage to provide audio output as a pitch proportional to the total fluorescence of the image. An analog circuit can be used to generate a TTL logic pulse when the voltage is within a predetermined range. An integrated circuit or voltage comparator can apply the TTL voltage back to the camera to gate image acquisition.

A graphical processing unit (GPU) can be in connection with the fluorophore localization module, and be configured to provide processing for the fluorophore localization module for localizing fluorophores. Further, a graphical user interface can be used to provide an interface for a user to interact with captured images, created three dimensional models, and other data.

In one aspect, the system may include a multi-well plate imaging module configured to automatically move from one sample well to another to image a plurality of sample wells. The multi-well plate imaging module can be configured to automatically translate the sample in any direction to provide optimal imaging. Also, the multi-well plate imaging module can be configured to simultaneously image any number of individual molecules within a single cellular compartment.

Molecule-molecule binding of molecules in the sample can be measured using a molecule-molecule binding measurement module. The sample can optionally include living cells. In some situations, it may be useful to image these cells in various environments and in differing conditions. The system described herein may be used for samples which are in vivo, ex vivo, in vitro, perfused, etc. In one alternative aspect, the sample may be incubated in gas. In the case of a gas-incubated sample, the system can further comprise a gas control module configured to control the gas in which the sample is incubated. To better control the sample environment, the system can include a temperature control module configured to control a temperature of the sample and/or a humidity control module configured to control a humidity of the sample.

Figure 9:
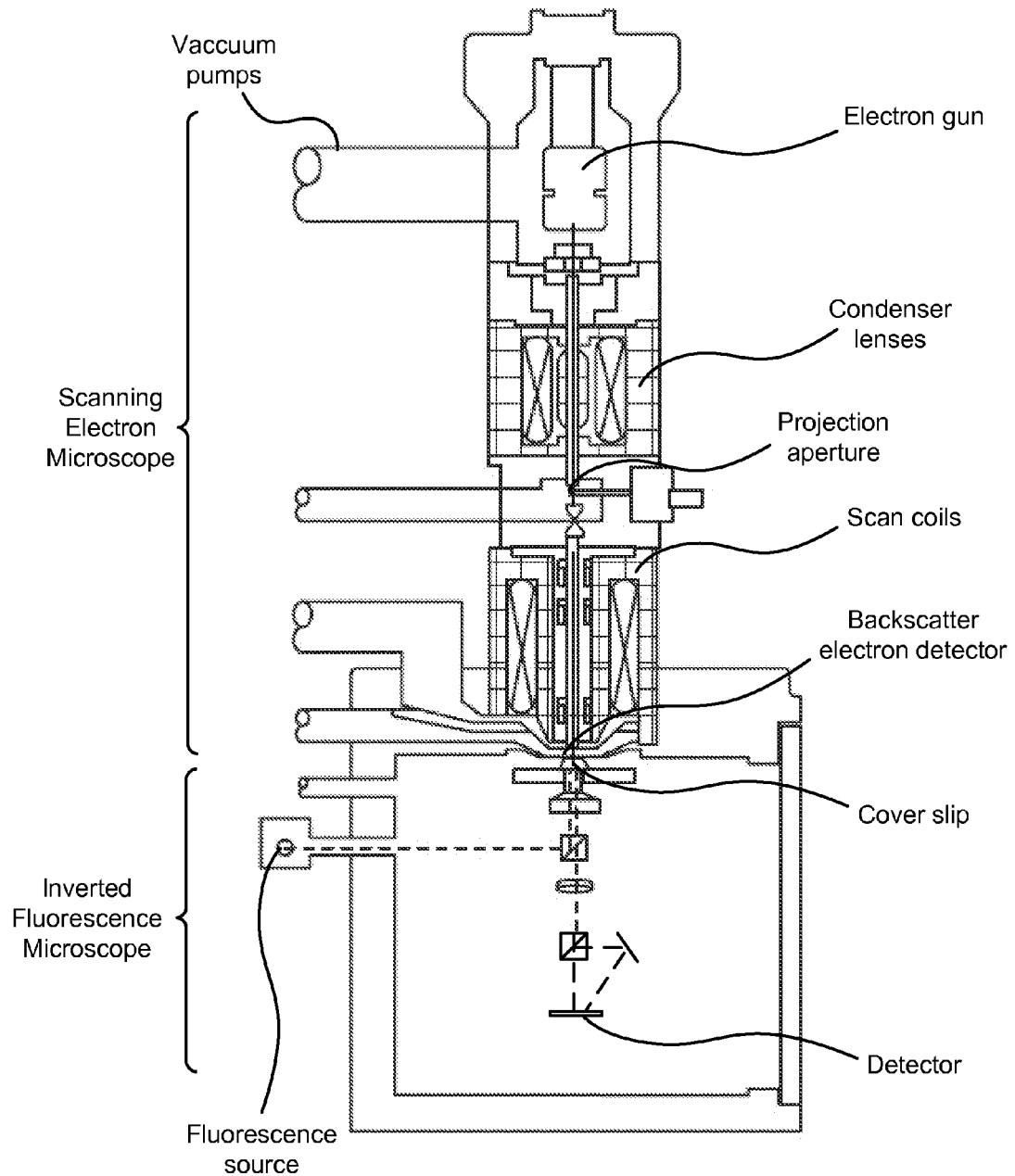
FIG. 9 is a microscopy system as described herein and as combined with a scanning electron microscope (SEM) in accordance with one embodiment.

The system can include a conventional microscope for simultaneous or sequential imaging of the sample. Alternately, or additionally, the system can include an electron microscope configured to acquire electron microscope images of the sample simultaneously or sequentially with the camera. Some examples of contemplated electron microscopes include a scanning electron microscope (SEM) and a transmission electron microscope (TEM). In one exemplary embodiment, the system can be located inside the SEM. Referring to FIG. 9, an SEM is provided with an inverted fluorescence microscope under the electron microscope (EM). The structure of an SEM typically includes a cavity beneath EM. The system herein may be placed or constructed within the SEM cavity. Though the figure shows a more simplistic fluorescence microscope than the system described in FIG. 1, for example, one can readily appreciate how the present system may be integrated into an SEM microscope to create a larger system with more capabilities and applications than either an individual SEM or a microscopy system as described herein. The electron microscope can be configured to display images of the sample simultaneously with image acquisition by the camera.

As described herein, the system can image in vivo, ex vivo or in vitro, molecules, materials, cells, tissues, organisms whether alive or preserved. The system can image these molecules, tissues, etc. where perfusion, temperature, humidity and other environmental conditions need be meet. In one aspect, the system can be used to collect and record information about:

a) PAFMs attached to proteins expressed from an influenza virus;
b) PAFMs attached to lipids;
c) PAFMs attached to the biology of cancer including but not limited to all forms of cancer and nuclear architecture;
d) membrane biology, including but not limited viral uptake and expression at the surface of proteins important to function, cell-cell interaction and disease related defects; and
e) PAFMs attached to the biology of neuroscience and disease, including but not limited to, peripheral neuropathy, Alzheimer's, Multiple Sclerosis, synaptic function, spinal injury and nerve degeneration and regeneration.

A benefit of the system disclosed herein as compared with the prior art is the use of LEDs. LEDs provide a non-coherent light source and can be much less expensive than a laser light source. Another benefit is the use of automation (AOTF) for laser control as well as the use of a TIRF condenser in a 3-Dimensional Sub-diffraction microscopic system. The system can make use of commercially available microscopic platforms. Adjustments to such platforms can be minimal and provide cost savings to consumers and manufacturers. Another benefit of the system and method is the use of dual cameras, which allows for multi-channel axial, biplane image acquisition.

The microscopy system and method can offer both TIRF and Biplane imaging, as well as multi-channel acquisition in the same microscope. This system provides clear advantages over prior art systems which are generally only able to accommodate 2-dimensional imaging, and single channel acquisition. Other 3D imaging systems do not use a TIRF condenser. The system and method can retail for considerably less money than existing prior art systems, even as much as 75% less.

EXAMPLE

An example Biplane Fluorescent Photoactivation Localization Microscope (Biplane-FPALM) will now be described. A version of the Till Photonics Imic microscope was modified for use in this technique. The microscope itself provides a unique platform that is highly unconventional when compared to more conventional commercial systems, in that, it is modular and lacks basics seen in other systems, e.g oculars. Additionally, the Imic allows access to the entire light path to easily manipulate the system for use in all the iterations described herein. Further, the system allows removal of the TIRF condenser and placing it away from the microscope, where it would normally be attached to the scope. This allows placement of additional optics necessary for Biplane between the beam steering device that is the TIRF mirror and the internal components of the scope. Finally, the image acquisition software, Till Vision, proved to be ideal for capture of Biplane and Biplane FPALM images with little adaptation. The collection is an endogenous function of the software and can export the files to a format usable in an image analysis software.

The system was constructed on an isolation table, measuring 35"×59"×4" (Technical manufacturing corporation), providing a floating surface that isolates the system from vibration and other environmental hindrances to achieving single molecule resolution images. Additionally, the table was further buffered from vibration by placing the table on 4 isolation pads, one under each leg of the table (Kellett Enterprises). The table was floated using house air and a pressure of 40 lbs was maintained, regulated both by the house air regulator and the use of an inline regulator with pressure gauge. The air was run through a 300 psi air hose. To facilitate all of the components of the build a side shelf was added to the table, measuring 14"×36", housing electrical components for the TIRF condenser controller. Additionally, a sub-shelf was added to the lower part of the table, measuring 18"×40", housing the electronic control unit for the Microscope as well as the power supply for the TIRF condenser controller. Note that there is no vibration isolation for the 2 shelves described here as it is not necessary for these parts to be isolated, nor do the shelves transfer vibration through the electrical connections to the microscope and condenser.

The Imic microscope for this application is comprised of the base stand which has 4 levels plus the top where the stage and objective turret is located. The stage is a Prior translational stage which has fine movement in the X, Y and Z axis and is controlled by the Till Vision software. Additionally, the top of the microscope houses a turret which holds up to 4 different objective lenses and allows through the Till Vision software rapid changing of the objective lens. The objective lenses used in this application are: PLAN-APOCHROMATIC 10×/0.45 NA; PLAN-FLUOR 100×/1.45 oil; and 60× PLAN-APO 1.2 NA Water. The first level, starting from the top, provides the entrance to the microscope for the detection side optics and beam path. Internally, level 1 also houses the filter slider, an automated filter switching device that is controlled by Till Vision allowing one to rapidly switch between multiple filter sets. The filter slider provides a place holder for the filter cubes needed for this and other applications. This filter cube contains a dichroic, (Semrock #Di01-R561-25x36,) and an excitation filter, (Semrock #FF01-605/64-25). The filter is located directly beneath the turret and the objective lens. Spanning levels 1 and 2 is a Zeiss tube lens with a length of 143 mm. On the second level is also located a mirror which reflects the excitation beam out of the microscope body towards the external excitation optical train and the EMCCD camera. Level 3, once used by Agilent for FRET applications is not used here and is blank. Level 4 of the Imic houses the electronics which drive the microscopes automation through the electronic control unit and the Till Vision Software.

The TIRF condenser, (Till Photonics, Polytrope), normally attached to the microscope on level 1 where an excitation beam path would enter the microscope, was removed from the microscope stand. The TIRF condenser was placed approximately 55 mm from its original position and was offset from the original port on the microscope body by approximately 16 mm to one side. This allowed folding the beam path once between the condenser and the entrance port. Here the condenser was used as a beam steering device. Biplane imaging was done using the center or widefield position of the back aperture of the objective lens. (This can also be done at the critical angle or side of the back aperture in the TIRF position). This allows movement of the beam in its path from the condenser to the objective lens, optimizing for our application.

Optics extending in the beam path were added between the TIRF condenser and the microscope stand. This provided for the use of a detection side field aperture to limit the extent of the sample's exposure in the X and Y axis. This was done so that only the field being sampled is exposed to both the activation (405 nm) and readout lasers (561 nm). Starting from the back aperture of the objective lens, within the microscope stand itself and moving towards the TIRF condenser are the following optics. Measuring 200 mm from the back aperture there is a mounted achromatic doublet, f=200 mm, 400-700 nm in the beam path which refocuses the beam following exit from the aperture to the objective. A distance of 200 mm from this lens moving towards the condenser there is a 1 mm×1.2 mm field aperture, dictating the exposure area within the sample (the size of this aperture can be changed to meet ones needs, the size shown here was used in the instrument described here). A distance of 200 mm from the field aperture, an additional mounted achromatic doublet, f=200 mm, 400-700 nm is used to collimate the beam prior to the aperture. The two, f=200 lenses and the field aperture were all mounted on a sliding rail and positioned to be in line with the entry port that was, in its original configuration, where the TIRF condenser was located on the Imic. The height of the lenses from the table is 19.5 cm (centered to the entry port). Located on a pedestal, at 19.5 cm from the table, and 5 cm from the f=200 lens furthest from the microscope, is a mirror (mirror 1) which opposes a second mirror (mirror 2) located 23 cm away. The two mirrors fold the beam path between the TIRF condenser and the optics on the rail leading to the microscope. The TIRF condenser was located 22 cm from mirror 2. The reason for folding the beam path is two-fold. First, by convention, to allow for 200 mm from the f=200 in the furthest position from the microscope. Second, this allows room not only for this 200 mm length but also space to accommodate the original focal length of the TIRF condenser. When both the TIRF condenser focal point and the 200 mm required by the f=200 lens are added the table cannot accommodate this distance in a straight line from the entry point of the microscope stand to the TIRF condenser, hence the folding of the beam path. Additionally, the two mirrors provide the ability to adjust the lasers within this path to the two, f=200 lenses. Mirror 2 focuses the beam to the f=200 furthest from the microscope and mirror 1 focuses the beam through the field aperture and to the f=200 lens closest to the microscope, which is positioned 200 mm from the back aperture of the objective. The beam should travel through the detection optics and into the scope in a straight manner, not bent or curved. This is enabled by the adjustment described above.

The configuration supplying the activation and readout wavelengths for this instrumentation involved both 405 nm and 561 nm lasers. Additionally, an acoustic optical tunable filter (AOTF), shutter, and 2× beam expander were used. Starting with the 561 laser, the beam can be run through a "beam box" a small box that contains 2 mirrors and either a $3^{rd}$ mirror or dichroic lens to direct the beam out of the box. Here, in the 561 beam box there is both a near field and far field correction mirror (adjustable) and a $3^{rd}$ directional mirror (fixed position). The laser was placed close to the box so the that emitted beam is directed and centered into the box hitting the near field mirror, followed by the far field mirror, then is reflected by the directional mirror out of the box and into a second box containing the 405 nm laser line optics. The use of the two adjustable mirrors, (near and far field adjustment mirrors) is valuable for one to have the ability to "walk the lasers", or linearize multiple laser lines into a single beam path. The 405 nm laser is directed into a box that is similar to the one previously described for the 561 nm laser. However, the 405 nm box replaces the fixed directional mirror with a dichroic lens; this lens will allow the 561 laser line being directed into this box to pass through the lens and out of the 405 nm box. The dichroic lens also reflects the 450 nm laser line, combining it with the 561 laser line. Both laser lines are directed towards the AOTF which is seated within a third box, in line with both the 561 and 405 nm boxes. Between the 405 nm box and the AOTF box is a shutter which allows one to block the lines collectively from being introduced to the AOTF. The lines are directed into the ATOF so that there is 2-fold control of these lines. For our application, and to switch fluorescent molecules slowly, in a sparse subset manner, the 405 nm laser, e.g., the activation laser, can be attenuated to very low levels. This is achieved optimally by use of the ATOF and this beam can typically be adjusted to the nano-watt level. Conversely the 561 nm laser line may provide as much power to the sample as possible, as once the sparse subset is switched, it is necessary to excite the molecule, collect the emitted photon, and finally irreversibly bleach the molecule. The AOTF allows combination of the laser lines while individually dictating the power of each and without the use of neutral density filters. By manually setting the total power level for each laser through the ATOF's remote control, total power levels can be translated to the Till Vision software, where a slider tab in the software allows further attenuation of laser lines. As an example, the 405 nm laser can be set at ~400 nW output. This would represent 100% of the power possible in the software by using the slider tab. Therefore there is a range of between 0 and 100% power or 0-405 nW possible power for this line. Finally, the use of the Till Vision software, Imic microscope and EMCCD camera along with the AOTF allows the system to coordinate the ATOF laser pulse with the camera shutter to time acquisition of the image throughout the entirety of the system. Finally, directly after the AOTF there can be a 2× beam expander. This beam expander can make the beam leaving the ATOF bigger, resulting in a more homogenous excitation of the field of view.

On the detection side of the microscope, where the excited and emitted photons are directed to and collected by the EMCCD and/or camera, the microscope itself may be left, as previously described. The beam height was 14 cm leaving the body of microscope. The beam is propagated through a mounted achromatic doublet, f=75 mm, 400-700 nm lens positioned 15 cm from the edge of the microscopes leading edge on the emission side. An additional 26.5 cm from that is a f=200 mm, 400-700 nm lens. The use of the f=75 plus the f=200 provides one a 2.7 increase in magnification ($^{200}/_{75}$) Immediately following the f=200 lens, at 5.4 cm is a 20 mm beamsplitter cube, 400-700 nm, lambda/10. This cube will "split" the beam, or more accurately provide an equal probability that the emitted photon can either, one, take the shorter route to the camera, directly through (straight) the beam splitter (transmitted light path), or two, be directed sideways from the beam splitter to a mirror and then on to the camera, a longer beam path (reflected beam path). In the reflected path there is 9 cm from the beam splitter a mirror position to redirect the beam (photon) to the camera chip. An Andor EMCCD camera can be positioned at a distance of 75 cm from the beam splitter cube where both the transmitted and reflected light paths are directed. Importantly, the transmitted and reflected light paths are directed to separate sides of the camera chip. This splitting of the chip allows us, in one image, to have both the light paths present. These light paths can easily be adjusted by imaging a known structure, here 40 nm beads, in both light paths simultaneously while adjusting the optics to direct the two paths to each half of the camera chip equally. Finally the entirety of the detection side optics can be encased within a light tight box. Common building supplies, such as may be purchased form a home repair store, can be used to construct the box. For example, ¼ plywood cut to size can be used with wood glue and small nails to create the box which fits tightly to and around the side of the microscope which the detection beam emits from. A lid can be created for the box using metal latches so one can have access to the optics without removing the box. Finally holes can be drilled into the box to allow the electronics for the camera to enter and also to allow for the cooling tubes for the camera.

Cooling the camera is important to providing an appropriate signal to noise ratio. The Andor EMCCD comes with an internal fan as part of its Peltier cooling mechanism; however the fan induces vibration and drift within the image. Through the Till Vision software, there is the ability to interrupt the fan and eliminate the induced vibration and drift. An external liquid cooler can be used, such as a cooler purchased from Koolance Inc. This radiator cooling system uses an antifreeze, fans, and pumps to constantly infuse through the cameras own cooling ports antifreeze. These ports are adapted for liquid cooling. This allows temperatures of <−90 F to be maintained. It is worth noting that the temperatures achieved by liquid cooling not only eliminate the need for the camera's fan but maintain and keep steady much lower temperatures than the cameras fan can provide alone. The additional cooling provides for a better image.

Finally, the entire system is run through a high powered computer which is connected to the microscope and it parts through the electronic control unit. The computer then uses the Till vision software to drive the entire system, from hardware movement to image collection and analysis.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A microscopy system for creating three dimensional images using probe molecules, comprising:
   a sample stage for mounting a sample, said sample containing the probe molecules;
   an optional activation light source configured to illuminate the sample with an activation light and to activate probe molecules in at least one subset of the probe molecules;
   a readout light source configured to illuminate the sample with a readout light and to cause luminescence in the at least one subset of the probe molecules;
   an acoustic optical tunable filter (AOTF) configured for fine tuning a power of the activation light source and the readout light source;
   an objective lens configured to direct a light beam from the readout light source toward the sample;
   a total internal reflection fluorescence condenser configured to alter a beam path of the light beam between a region proximal to an edge of the objective lens and a region proximal to a center of the objective lens;
   a beam splitter positioned to split the luminescence into at least two luminescence beams corresponding to at least two object planes in the sample;
   at least one camera positioned to capture a plurality of images by detecting the luminescence from the at least one subset of the probe molecules when the beam path of the light beam is directed through the region of the objective lens proximal to the edge of the objective lens and when the beam path of the light beam is directed through the region proximal to the center of the objective lens and capture the plurality of images; and
   an image construction module which combines the plurality of captured images from the at least two luminescence beams and constructs a three dimensional image using the plurality of captured images.

2. A system in accordance with claim 1, wherein the activation light source and the readout light source comprise a single laser.

3. A system in accordance with claim 1, wherein the camera comprises an electron multiplying charge coupled device (EMCCD) having a plurality of detection channels.

4. A system in accordance with claim 1, wherein the AOTF is configured to control the light sources to provide time-dependent sequences of illumination of at least one wavelength.

5. A system in accordance with claim 1, wherein the beam splitter comprises one or more of: a dichroic mirror, a 50:50 beam splitter; or a polarizing beam splitter.

6. A system in accordance with claim 1, wherein a transmitted light is imaged by differential interference contrast.

7. A system in accordance with claim 1, further comprising a conventional microscope for simultaneous or sequential imaging of the sample.

8. A system in accordance with claim 1, wherein the sample comprises cells having photoactivatable or photoswitchable fluorescent molecules (PAFMs) residing in a biological membrane, including photoactivatable or photoswitchable fluorescent proteins or photoactivatable or photoswitchable fluorescent lipids or lipids with photoactivatable or photoswitchable fluorescent molecules attached by a chemical bond.

9. A system in accordance with claim 8, further comprising an image acquisition module which automatically monitors the fluorescence images, and automatically triggers image acquisition when a number of active fluorophores is between predetermined thresholds.

10. A system in accordance with claim 1, wherein the image construction module is adapted to analyze images from the camera and calculate at least one value or measure of a total florescence and a number of pixels over a threshold fluorescence value within a user defined region of interest, generating a single scalar value varying with time.

11. A system in accordance with claim 1, further comprising a feedback module which provides user feedback triggering image acquisition using an analog voltage representing the total fluorescence output of the camera, wherein the feedback module comprises a speaker attached to the voltage to provide audio output as a pitch proportional to the total fluorescence of the image.

12. A system in accordance with claim 1, wherein at least one of the probe molecules is a PAFM and is configured to use Forster resonance energy to transfer or receive energy to or from another probe molecule.

13. A system in accordance with claim 1, further comprising a sheet illumination beam steering device configured to steer at least one light beam from at least one of the activation and readout light sources parallel to the field of view through the sample.

14. A system in accordance with claim 1, further comprising an electron microscope configured to simultaneously or sequentially with the camera acquire electron microscope images of the sample.

15. A microscopy system of claim 1, further comprising a second beam splitter positioned to split the at least two luminescence beams into at least four luminescence beams.

16. A system in accordance with claim 1, wherein the at least two object planes comprises:
a first object plane corresponding to a first plane where the light beam path is proximal to the center of the objective lens back aperture; and
a second object plane corresponding to a second plane where the light beam path is proximal to the edge of the objective lens back aperture.

17. A method for creating three dimensional images using probe molecules, comprising:
mounting a sample on a stage, the sample having a plurality of probe molecules;
illuminating the sample with a light beam to cause probe luminescence in at least one subset of the probe molecules using a readout light source and an optional activation light source, the readout light source configured to illuminate the sample with a readout light to cause luminescence in the at least one subset of the probe molecules and the optional activation light source configured to illuminate the sample with an activation light to activate probe molecules in the at least one subset of the probe molecules;
fine tuning a power of the readout light source and the optional activation light source using an acoustic optical tunable filter (AOTF);
directing the light beam toward the sample using an objective lens and a total internal reflection fluorescence condenser which alters a beam path of the light beam between a region proximal to an edge of the objective lens and a region proximal to a center of the objective lens;
splitting the probe luminescence using at least two beam splitters into at least four paths corresponding to at least four detection planes corresponding to object planes in the sample;
detecting the at least four detection planes via a camera;
recording the object planes in corresponding recorded regions of interest in the camera; and
combining a signal from the regions of interest into a three dimensional image.

18. A method in accordance with claim 17, further comprising dichroically separating the probe luminescence into at least two wavelengths of light prior to or after splitting the probe luminescence, and wherein a first at least two of the at least four paths into which the probe luminescence is split correspond to a first wavelength of the at least two wavelengths, and a second at least two paths of the at least four paths into which the probe luminescence is split correspond to a second wavelength of the at least two wavelengths.

19. A method for creating three dimensional images using probe molecules, comprising:
mounting a sample on a stage, the sample having a plurality of probe molecules;
illuminating the sample with the light source, causing at least one subset of the plurality of probe molecules to fluoresce, wherein the light source is a readout light source and an optional activation light source, wherein the readout light source is configured to illuminate the sample with a readout light to cause luminescence in the at least one subset of the probe molecules and the optional activation light source configured to illuminate the sample with an activation light to activate probe molecules in the at least one subset of the probe molecules;
fine tuning a power of the readout light source and the optional activation light source using an acoustic optical tunable filter (AOTF);
directing a light beam from the light source through a first portion of an objective lens using a total internal reflection fluorescence condenser;
capturing a first image of probe molecule fluorescence corresponding to a first object plane using a camera;
directing the light beam from the light source through a second portion of the objective lens which is different from the first portion using a total internal reflection fluorescence condenser, and wherein at least one of the first and second portions of the objective lens causes total internal reflection of the light beam within a substrate supporting the sample;
capturing a second image of probe molecule fluorescence corresponding to a second object plane using the camera; and
constructing a three dimensional image using the captured images.

* * * * *

UNITED STATES PATENT AND TRADEMARK OFFICE
CERTIFICATE OF CORRECTION

PATENT NO. : 8,994,807 B2  
APPLICATION NO. : 13/257588  
DATED : March 31, 2015  
INVENTOR(S) : Brian Thomas Bennett et al.

Page 1 of 1

It is certified that error appears in the above-identified patent and that said Letters Patent is hereby corrected as shown below:

In the Specification

Column 1, line 5, add:

GOVERNMENT INTEREST

This invention was made with government support under AI065459 awarded by the National Institutes of Health. The government has certain rights to this invention.

Signed and Sealed this  
Thirtieth Day of June, 2015

Michelle K. Lee  
*Director of the United States Patent and Trademark Office*